C. C. TAYLOR.
CAR SEAT.
APPLICATION FILED OCT. 26, 1918.

1,298,823.

Patented Apr. 1, 1919.
2 SHEETS—SHEET 1.

WITNESS
W. H. Alexander.

INVENTOR.
C.C. Taylor.
BY
E. E. Huffman
ATTORNEY.

C. C. TAYLOR.
CAR SEAT.
APPLICATION FILED OCT. 26, 1918.
1,298,823.
Patented Apr. 1, 1919.
2 SHEETS—SHEET 2.
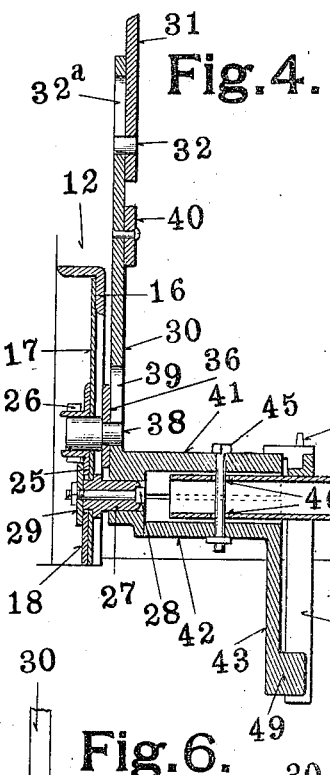
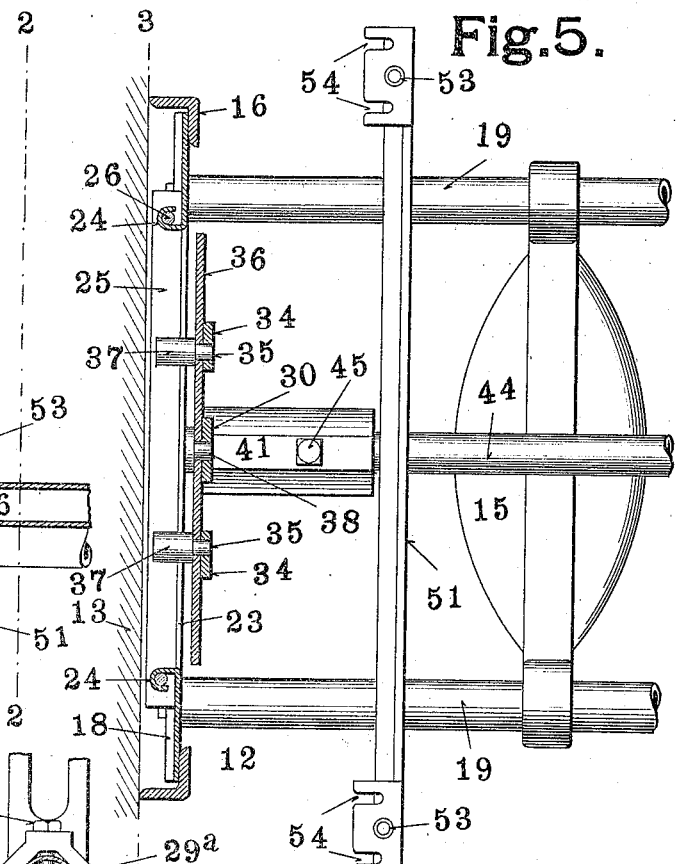
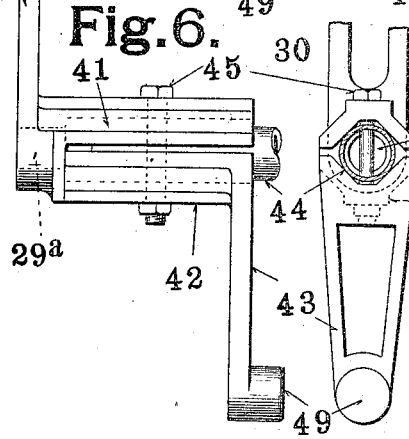
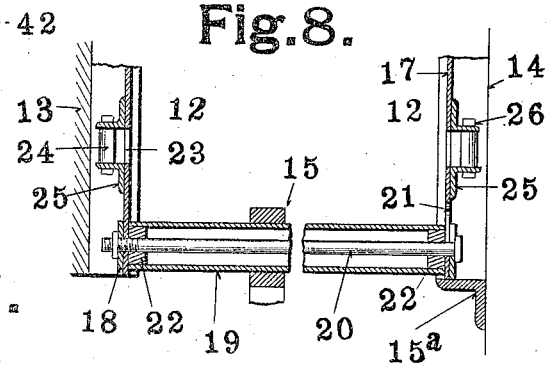
WITNESS
W. A. Alexander
INVENTOR.
C. C. Taylor.
BY
E. E. Huffman
ATTORNEY.

UNITED STATES PATENT OFFICE.

CALVIN C. TAYLOR, OF ST. LOUIS, MISSOURI, ASSIGNOR TO SCARRITT CAR SEAT AND MANUFACTURING COMPANY, OF ST. LOUIS, MISSOURI, A CORPORATION OF MISSOURI.

CAR-SEAT.

1,298,823.   Specification of Letters Patent.   Patented Apr. 1, 1919.

Application filed October 26, 1918. Serial No. 259,737.

*To all whom it may concern:*

Be it known that I, CALVIN C. TAYLOR, a citizen of the United States of America, residing at the city of St. Louis, State of Missouri, United States of America, have invented a certain new and useful Car-Seat, of which the following is such a full, clear, and exact description as will enable any one skilled in the art to which it appertains to make and use the same, reference being had to the accompanying drawings, forming part of this specification.

My invention relates to a car seat and more particularly to that type of car seat in which the back is moved from one side to the other of the cushion or seat proper without being inverted and at the same time the cushion or seat is moved laterally and inclined at a slight angle.

The object of my invention is to provide simple and effective means for the purpose above set forth which may be easily manufactured and in which the moving parts will not be likely to become jammed or injured in operation.

Figure 1:
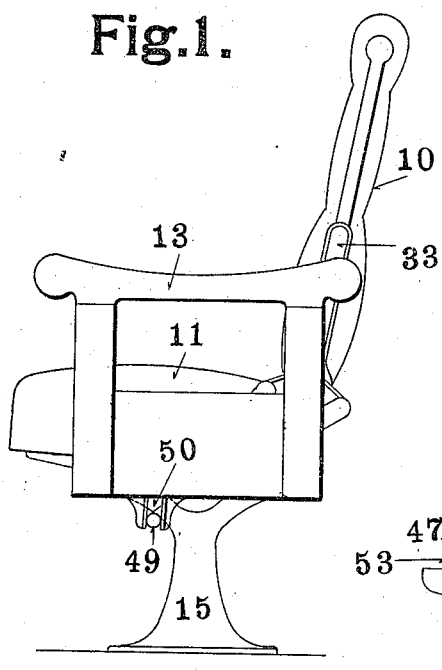
Figure 2:
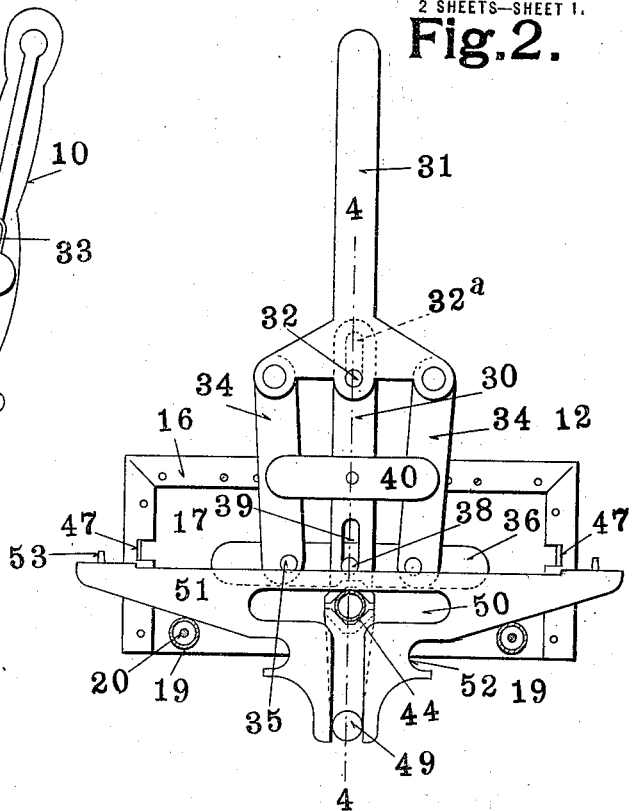
Figure 3:
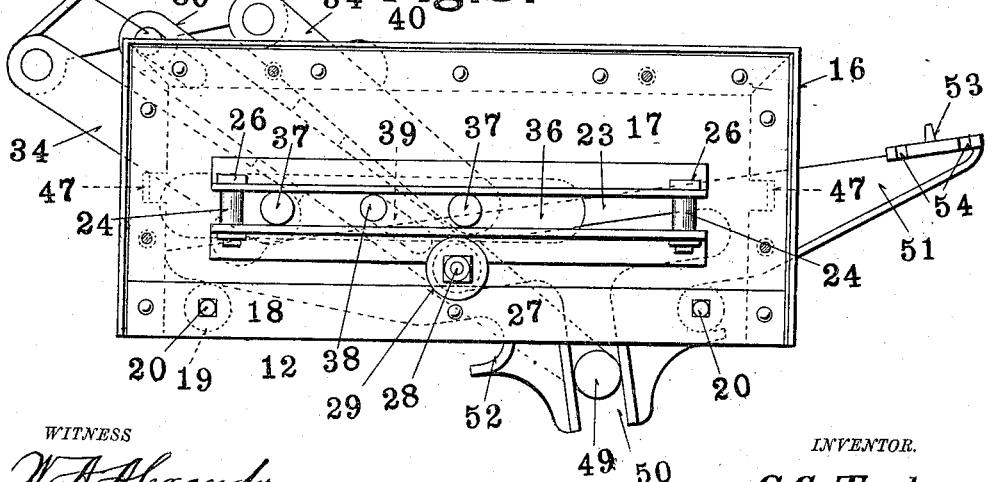

In the accompanying drawings which illustrate one form of car seat made in accordance with my invention, Figure 1 is an end elevation, Fig. 2 is an enlarged sectional view taken on the line 2—2 of Fig. 4 and Fig. 3 is an enlarged sectional view taken on the line 3—3 of Fig. 5 and Fig. 4 is a sectional view taken on the line 4—4 of Fig. 2. Fig. 5 is a top plan view, partly in section, of one end, the back and cushion being removed. Figs. 6 and 7 are an enlarged side and end view respectively of the cushion operating lever, and Fig. 8 is a longitudinal sectional view through a portion of the seat showing the manner of securing the end plates together.

Each of the end plates 12 consists of an angle iron frame 16 and a body 17 of sheet metal secured thereto by rivets or in any other suitable manner. The lower edge of the body 17 is preferably reinforced by a cross plate 18. The two end plates 12 are secured together by means of a pair of tubes 19 through which passes a bolt or rod 20 which also passes through the body 17 and reinforcing plate 18 of the end plates. At the inner or wall end these parts are provided with an enlargement 21 as shown in Fig. 8 to allow the passage of the head of the bolt 20. The bolt 20 is centered in the tube 19 by centering blocks 22. The outer ends of the tubes 19 are supported by the pedestal 15 while the inner ends are supported from the inner end plate which preferably rests on an angle iron support 15$^A$. Above the reinforcing plate 18 and parallel therewith each of the sheets 17 is provided with a slot 23, the ends of the metal removed from said slot being bent into loops 24 forming spacing pieces for angular guide bars 25, which guide bars are held against the spacing pieces 24 by bolts 26 passing through the said parts as best shown in Figs. 3 and 5. Between the reinforcing plate 18 and the lower guide bar 25, each of the end plates is provided with an inwardly projecting stud 27 held in place by a bolt 28 and washer 29, the latter bearing against the reinforcing plate 18 and the vertical flange of the lower guide bar 25. These studs 27 form the main pivots of the lever mechanism as will be hereinafter described.

Engaging with each of the studs 27 is a bearing 29$^A$ formed in the lower end of the lever 30, the upper end of which is pivotally and slidingly connected to a back carrying member 31 by means of a stud 32 carried by said member 31 and projecting through a slot 32$^A$ in the said arm 30. The back carrying members 31 are removably connected with the back 10 by means of pockets 33 on the said back. Pivoted to the seat carrying member 31 at their upper ends are a pair of links 34, the lower ends of which are pivoted by studs 35 to a shifting member 36 which is guided by means of the guide rails 25 hereinbefore referred to. The engagement between the shifting member 36 and the guide rails 25 is preferably obtained by extensions 37 of the pivots 35. The shifting member 36 is also provided with a stud 38 passing through a slot 39 in the lever 30. Secured to the lever 30 is a plate 40 for preventing lateral movement of the levers 34.

Each of the levers 30 is provided with an extension 41 between which and an extension 42 of the seat operating lever 43 a tube 44 is clamped by means of a bolt 45 extending through enlarged openings 46 in the said tube 44 so as to allow adjustment between said parts in order to secure simultaneous engagement of the links 34 with stops 47 formed integral with the frame 16 of the end plate. The lower end of each of the levers 43 is provided with a stud 49 engaging with a T-shaped slot 50 in one of the seat carrying members 51. The upper portion of said slot 50 engaging with the tube 44 so as to lock the said seat carrying member between the said tube and the tubes 19 except when the parts are in their central position as shown in Fig. 2. The seat carrying member 51 is also provided with recesses 52 adapted to engage with tubes 19 when the seat is in its normal position as shown in Fig. 3. The seat carrying members 51 are secured to the seat 11 by means of dowel pins 53 and screws passing through slots 54.

The operation of the seat is as follows: When the back is removed and the lever mechanism is in its central position as shown in Fig. 2 the seat 11 together with the seat carrying members 51 can be removed from or placed in position. When, however, the parts are moved to their normal position at either end, as shown in Fig. 3, the seat is locked against vertical movement. When the parts are moved to shift the back from one side of the seat to the other, the shifting member 36 is moved by engagement of the studs 32 and 38 with the slots 32ᴬ and 39. In this manner, the proper inclination of the back is secured by the links 34 without raising the back as high as is necessary when the back swings on the main pivot of the device. At the same time that the back is shifted from one side of the seat to the other the seat itself is moved laterally by the engagement of the studs 49 with the slots 50 and the proper inclination of the seat is secured by the engagement of the lower edges of the seat carrying member 51 with the tubes 19.

It will be evident that my device is simple in construction and reliable in operation and that the link members are so guided as to prevent any possibility of the binding of the parts.

Having fully described my invention what I claim as new and desire to secure by Letters Patent of the United States is:

1. In a car seat, the combination with a back carrying member, of a pair of links pivoted at their upper ends to said member, shifting pivots for the lower ends of said links, a connecting bar for said shifting pivots, and guiding means maintaining said connecting bar in horizontal position during the shifting movement of said pivots.

2. In a car seat, the combination with a back carrying member, of a pair of links pivoted at their upper ends to said member, shifting pivots for the lower ends of said links, a connecting bar for said shifting pivots, guiding means maintaining said connecting bar in horizontal position during the shifting movement of said pivot, and a third link turning on a fixed pivot and actuating said shifting pivots when the back is reversed.

3. The combination with a back, of a back carrying member, a pair of links pivoted at their upper ends to said member, the lower ends of said links turning on connected shifting pivots, and a third link turning on a fixed pivot and having sliding pivotal movement with relation to said back carrying member, said third link actuating said shifting pivots when the back is reversed.

4. The combination with a seat and back, of a back carrying member, a pair of links pivoted at their upper ends to said member, the lower ends of said links turning on connected shifting pivots, a third link turning on a fixed pivot and having sliding pivotal movement relative to said member, said third link actuating said shifting pivots when the back is reversed, and connections between said third link and the seat for shifting the latter.

5. The combination with a shifting seat and reversible back, of lever mechanism carrying said back and including a link movable on a fixed pivot, a seat shifting arm, and a connecting rod clamped between said link and arm.

6. The combination with a shifting seat and reversible back, of lever mechanism carrying said back and including a link movable on a fixed pivot, a seat shifting arm, and a connecting rod adjustably clamped between said link and arm.

7. The combination with a reversible back of a lever mechanism carrying said back, said lever mechanism including a member carrying shifting pivots, an end plate having a sheet metal body, said end plate being provided with a guide for said member formed by a pair of guide bars separated by spacing members integral with the body of said plate.

8. The combination with a shifting seat and reversible back, of lever mechanism carrying said back, said lever mechanism including a movable member carrying shifting pivots, an end plate having sheet metal body, said end plate being provided with a guide for the member formed of a pair of guide bars separated by spacing members integral with the body of said end plate, and connections between said lever mechanism and the seat for shifting the latter.

9. In a car seat, the combination with a back carrying member, of a pair of links pivoted at their upper ends to said member, shifting pivots for the lower ends of said links, a connecting bar for said shifting pivots, a third link turning on a fixed pivot, said third link having slotted connections with said connecting bar and with said back carrying member and guiding means for said shifting pivots.

In testimony whereof, I have hereunto set my hand and affixed my seal.

CALVIN C. TAYLOR. [L. S.]

Copies of this patent may be obtained for five cents each, by addressing the "Commissioner of Patents, Washington, D. C."